United States Patent [19]
McKinnon et al.

[11] Patent Number: 5,414,768
[45] Date of Patent: May 9, 1995

[54] APPARATUS FOR ELECTRICALLY AND MECHANICALLY CONNECTING AN AUXILIARY DEVICE TO A MAIN UNIT

[75] Inventors: Wayne McKinnon, Georgetown; David Bryant, Austin; William McRight, Round Rock; Edwin Kretzschmar, Austin, all of Tex.

[73] Assignee: Rolm Systems, Santa Clara, Calif.

[21] Appl. No.: 241,952

[22] Filed: May 12, 1994

Related U.S. Application Data

[63] Continuation of Ser. No. 903,583, Jun. 25, 1992, abandoned.

[51] Int. Cl.⁶ ............................................. H04M 1/00
[52] U.S. Cl. ..................... 379/428; 379/429; 379/436
[58] Field of Search ............... 379/428, 429, 435, 436, 379/356, 357, 144, 437, 440

[56] References Cited

U.S. PATENT DOCUMENTS

| | | | |
|---|---|---|---|
| 4,061,888 | 12/1977 | Rasmussen | 379/436 |
| 4,790,007 | 12/1988 | Richter et al. | 379/436 |
| 5,185,791 | 2/1993 | Itoyama et al. | 379/435 |

Primary Examiner—James L. Dwyer
Assistant Examiner—Jack Chiang

[57] ABSTRACT

An interconnect bracket which mechanically and electrically connects an auxiliary device to a main unit. Very few additional parts are required and the auxiliary device is user installable with minimal tools. The interconnect bracket provides the electrical connection by employing traces which run the length of the bracket. The interconnect bracket attaches to the bottom surface of the main unit and is configured to fit within receiving recess slots such that the bracket is substantially flush with the bottom surface of the main unit. As a result, no visible connectors or cables are necessary. The interconnect bracket is lightweight and contains guides which assist in the installation of the auxiliary device. The interconnect bracket provides a means of connection which enables the auxiliary device to separate from the main unit when subjected to forces such as would be experienced if the coupled units were dropped. This reduces the potential for damage to the components of the main unit and auxiliary device.

4 Claims, 5 Drawing Sheets

APPARATUS FOR ELECTRICALLY AND MECHANICALLY CONNECTING AN AUXILIARY DEVICE TO A MAIN UNIT

CROSS-REFERENCE TO RELATED APPLICATION

This is a continuation of Ser. No. 07/903,583 filed on Jun. 25, 1992, now abandoned.

BACKGROUND OF THE INVENTION

1. Technical Field

This invention relates generally to electrical connectors and, more particularly, to support brackets for upgrade expansion modules which incorporate electrical connectors.

2. Related Art

Conventional telephone model product lines typically include a basic telephone which contains the most basic and common features desired and used by the telephone user. In addition to these basic functions, a basic telephone may need to perform additional functions which a customer may need or desire. These are typically referred to as upgrade features. Examples of such upgrade features include adding a speaker, encryption or decryption of the voice message, adding a headset to the telephone, or interfacing the basic telephone to a recording device to record voice messages. Typically, these upgrade features require function keys or push buttons to enable the user to provide input and control.

One conventional technique used to provide additional function keys has been to create a new, larger telephone with a larger surface area than the basic telephone. The larger surface area will then support the basic function keys as well as the additional keys associated with the upgrade feature. This technique has proven to be uneconomical due to the cost of designing and maintaining multiple model product lines of telephones, including a product line with basic features as well as other product lines with specific upgrade features. This technique has also resulted in additional costs to support trained service personnel to install the new models with the upgrade features at the customer's site.

Another conventional technique has been to add an expansion module containing the additional function keys to the basic telephone. An expansion module which contains additional function keys is referred to as a key expansion option (KEO) module. One conventional method for adding a KEO module to a basic telephone is to attach a piece of sheet metal to the bottom of the basic telephone and then attach the KEO module to the same piece of sheet metal. Electrical connections between the KEO module and the basic telephone are provided via a cable assembly. A disadvantage of this technique is the increased cost of additional parts and assembly. In addition, the bottom surface of the basic telephone must be dedicated to this KEO module attachment, thereby limiting the additional features which can be added to the basic telephone. Also, the weight of the entire telephone is significantly increased, leading to more component failures if the telephone is dropped.

There is a need for a coupling mechanism, for connecting a KEO module to a basic telephone which is user installable and cosmetically appealing. There should not be, for example, visible wires nor dangling cables connecting the KEO module and the basic telephone. The basic telephone should not have connectors visible to the user when no KEO module is installed. Also, the attachment means should be light in weight in order to avoid damage to the basic telephone or KEO module components should the telephone be dropped.

SUMMARY OF THE INVENTION

This invention provides an interconnect bracket to connect an auxiliary device to a main unit. In the preferred embodiment of the present invention, the main unit is a basic telephone and the auxiliary unit is a key expansion option module. The interconnect bracket provides the necessary electrical connections between the basic telephone and the key expansion option module and provides the mechanical support necessary to secure the key expansion option module to the basic telephone. As a result, very few additional parts are required.

The interconnect bracket provides the electrical connection in the preferred embodiment by employing traces, which run the length of the bracket. The interconnect bracket attaches to the bottom surface of the main unit and is configured to fit within receiving recess slots such that the bracket is substantially flush with the bottom surface of the basic telephone. The interconnect bracket contains guides which assist in the installation of the auxiliary device and provides a means of connection with the key expansion option module which enables the device to separate from the basic telephone should the combined unit be dropped.

The interconnect bracket is user installable and requires minimal tools. Since the interconnect bracket attaches to the base of the main unit, no visible connectors are required on the main unit. The interconnect bracket also electrically connects the main unit with the auxiliary device. Therefore, no cables or wires are necessary. The interconnect bracket snaps into the key expansion option module in such a manner that it releases when it is subjected to forces such as would be experienced if the coupled units were dropped. This reduces the potential for damage to the components of the basic telephone and key expansion option module.

BRIEF DESCRIPTION OF THE DRAWINGS

The foregoing and other features and examples of the invention will be apparent from the following more particular description of preferred embodiments of the invention as illustrated in the accompanying drawings in which.

DETAILED DESCRIPTION OF THE INVENTION

The preferred embodiment of the present invention will now be described with reference to FIGS. 1–7, where like reference numbers refer to like elements.

Figure 1:
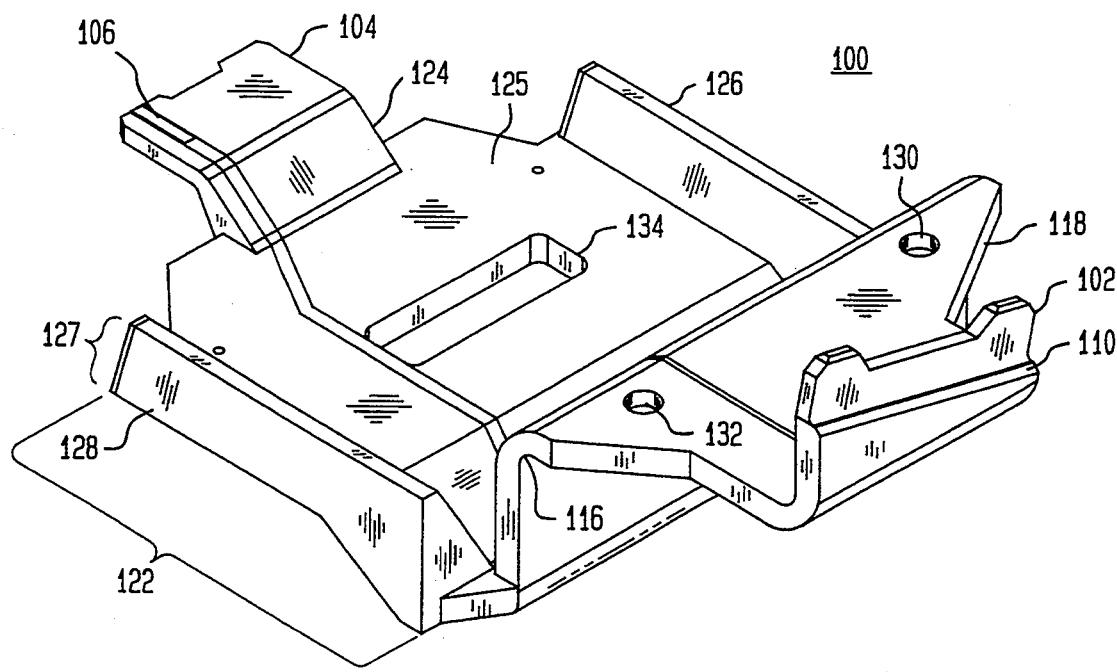
FIG. 1 is a perspective view of the key expansion option interconnect bracket with the main unit bracket elevated.
Figure 2:
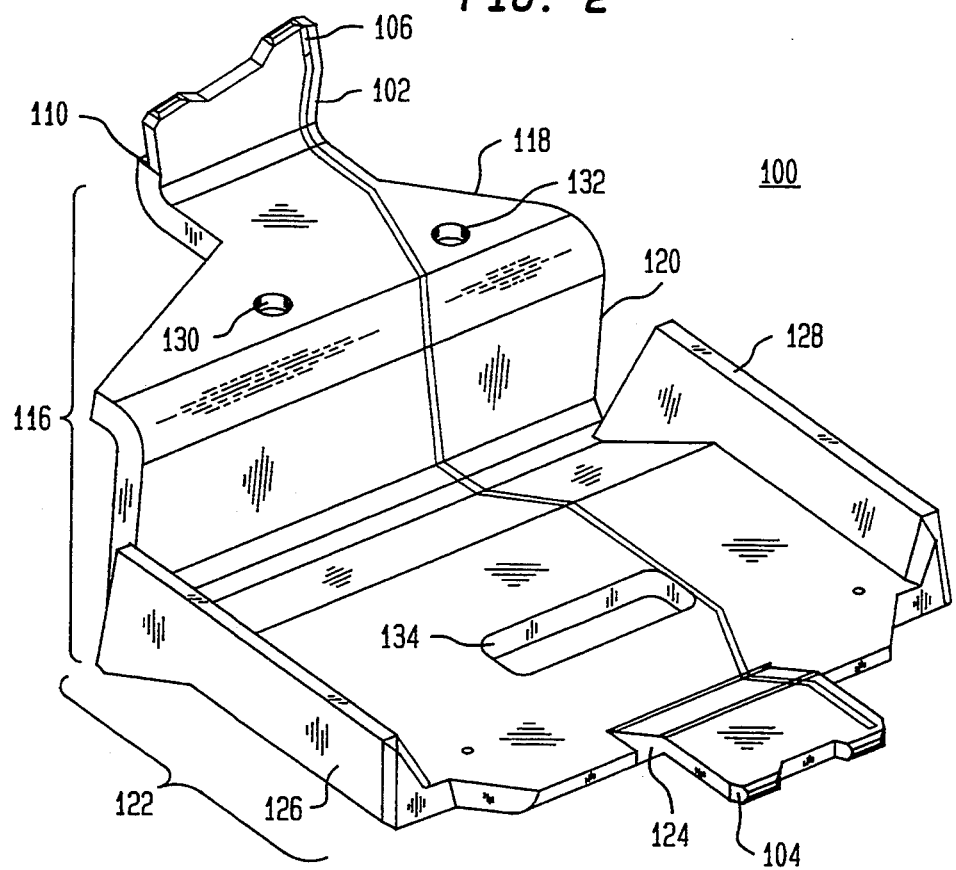
FIG. 2 is a perspective view of the key expansion option interconnect bracket illustrating a trace element which terminates on both connectors.
Figure 3:
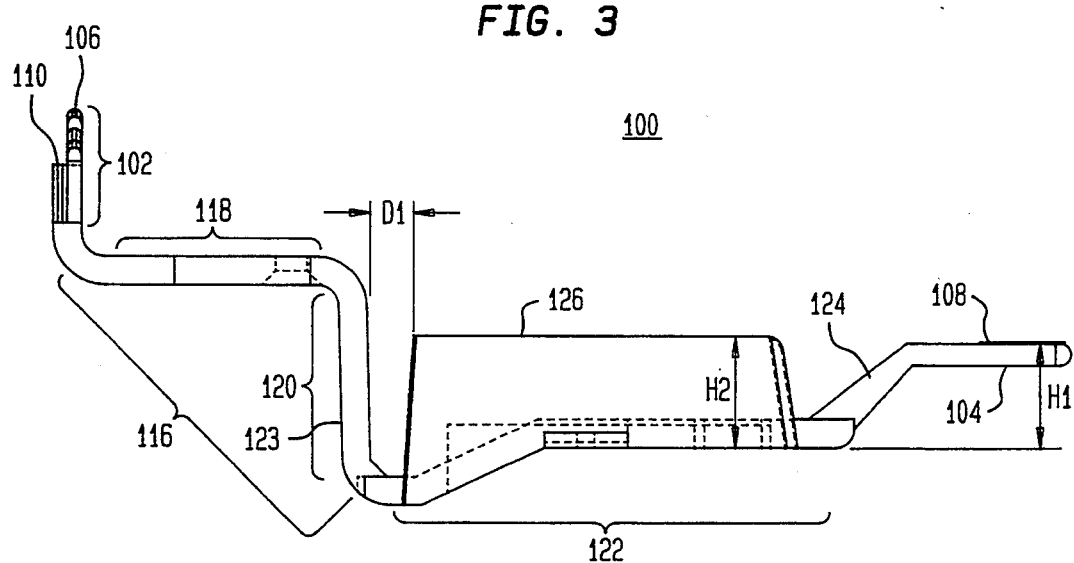
FIG. 3 is a side view of the key expansion option interconnect bracket.

FIGS. 1 and 2 illustrate different perspective views of key expansion option interconnect bracket 100. FIG. 3 illustrates a side view of key expansion option interconnect bracket 100. The key expansion option interconnect bracket 100 is preferably a single piece made of injection molded lightweight plastic. The key expansion option module bracket 100 performs two functions: (1) it provides the necessary electrical connections between the basic telephone 200 and the key expansion option module 300, and (2) it provides the mechanical support necessary to secure the key expansion option module 300 to the basic telephone 200.

Referring to FIGS. 1 through 3, bracket 100 has a main unit connector or a main unit tab 102 on one end and an auxiliary device connector or module tab 104 on the opposite end. Multiple traces (example trace 106 is shown in FIG. 2) run along the surface of key expansion option interconnect bracket 100. The traces terminate on one side at the main unit tab 102 and on the other side at module tab 104. For clarity, only a single trace element 106 is illustrated in its entirety. The other traces appear on the surface of bracket 100 in a similar manner. Traces are raised electrical contacts which carry signals received at one tab and transfer the signal to the other tab. Main unit tab 102 also contains a stopping edge 110 on main unit tab 102 on the side opposite the side on which the traces terminate. Any number of traces may be used, depending on the communication requirements of the main unit and auxiliary device. If a very large number of communication channels is required, traces may also be run along the surface opposite surface 125.

The main unit tab 102 is connected to a main unit bracket 116. Main unit bracket 116 has two sections, a tab extension 118 and an elevator member 120. Tab extension 118 extends from the elevator member 120 and is connected to main unit tab 102. Tab extension 118 also contains fastening holes 130 and 132.

A coupling bracket 122 is connected to elevator member 120 at the end opposite to tab extension 118. Coupling bracket 122 has a riser 124 connected to it on its end opposite to the main unit bracket 116. Riser 124 connects module tab 104 to the main body of coupling bracket 122 and elevates the module tab 104 above the surface 125 of the coupling bracket 122 a height H1.

Coupling bracket 122 has a first guide 126 on one side and a second guide 128 on an opposite side as shown in FIGS. 1 through 3. Guides 126 and 128 extend the length of the coupling bracket 122 from its connection to the main unit bracket 116 to the riser 124. The guides 126 and 128 extend above surface 125 of the coupling member 122 to height H2. A snap-connector aperture 134 is located near the center of coupling member 122.

Figure 4:
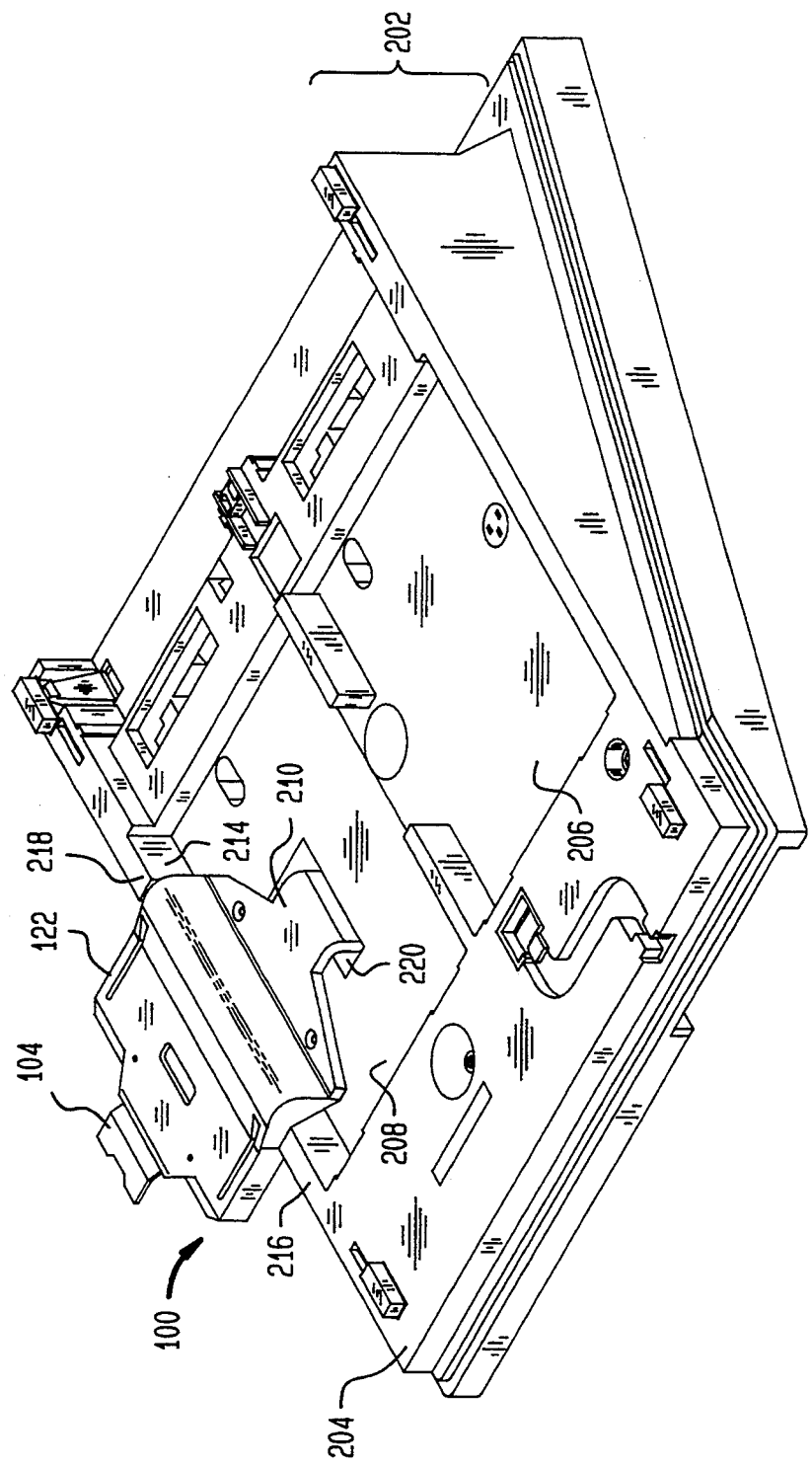
FIG. 4 is a front bottom perspective view of the basic telephone with the key expansion interconnect bracket installed in the base of a basic telephone.
Figure 5:
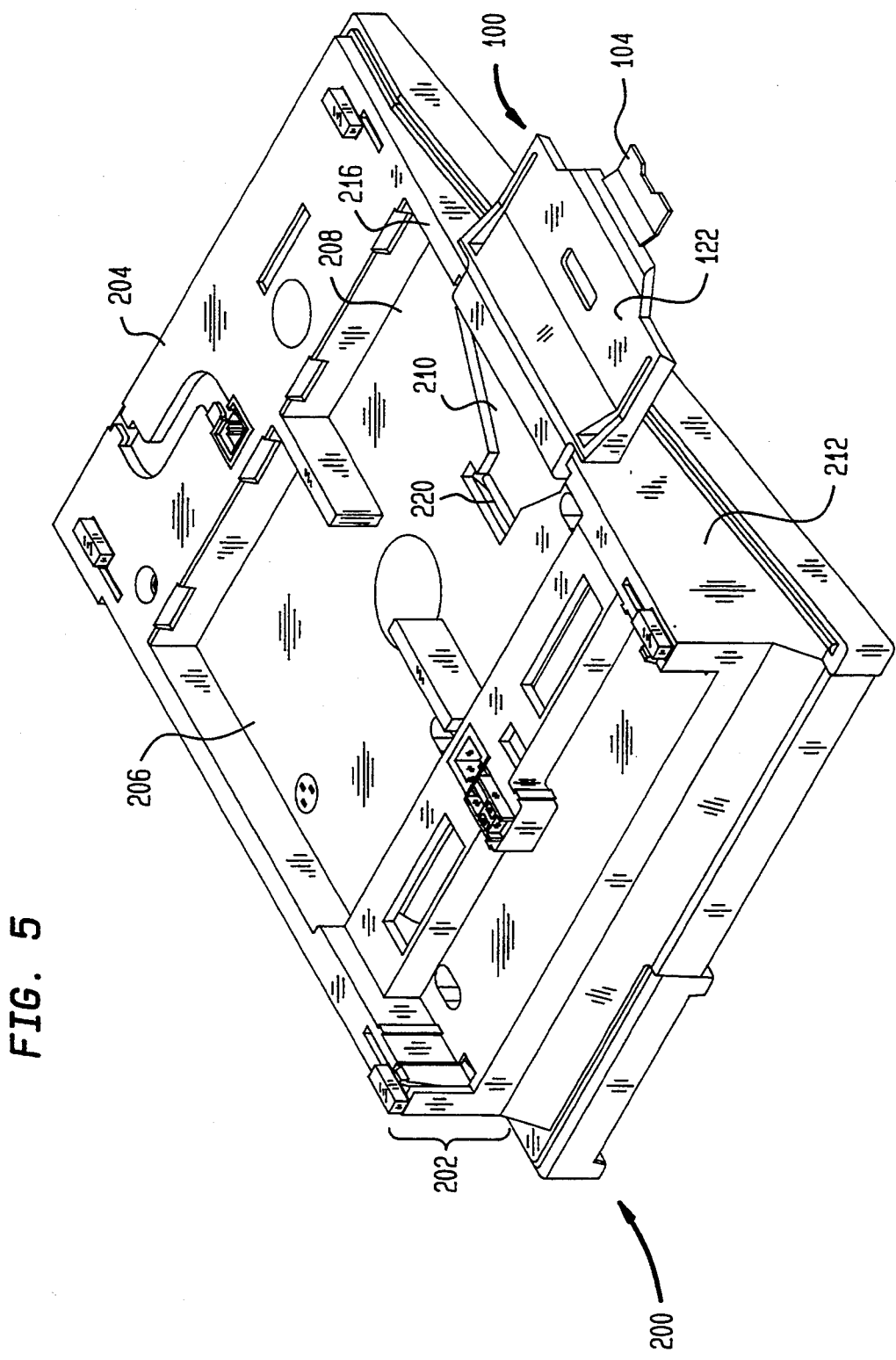
FIG. 5 is a rear bottom perspective view of the basic telephone with the key expansion interconnect bracket installed into the base of a basic telephone.

Referring to FIGS. 4 and 5, a bottom perspective view of a main unit, shown here as basic telephone 200, is illustrated. Basic telephone 200 has a base 202 with a bottom surface 204. The basic telephone 200 has two option module bays 206 and 208 on the bottom surface 204 of the base 202. The base 202 of basic telephone 200 also has a bracket receiving recess 210 (partially obscured in FIG. 4 by tab extension 118) which includes a tab receiving slot 220 at one end. The bracket receiving recess 210 and tab receiving slot 220 are configured to receive tab extension 118 and main unit tab 102 such that the exposed surface of tab extension 118 is substantially flush with the bottom surface of option module bay 208.

The base 202 of basic telephone 200 has a side wall 216 which has an outside surface 212 and an inside surface 214. The inside surface 214 has a recessed area 218 to receive elevator member 120 such that the outer surface 123 (see FIG. 3) of the elevator member 120 is substantially flush with the inner surface 214 of side wall 216.

The bracket receiving recess 210, tab receiving slot 220 and the recessed area 218 together cooperate to prevent the key expansion option bracket 100 from interfering with the installation or operation of modules installed in option module bay 208. When the key expansion option bracket is installed in the basic telephone 200, the main module bracket 116 is completely recessed into the bottom surface 204 of the base 202 and the inner surface 214 of side wall 216.

Figure 7:
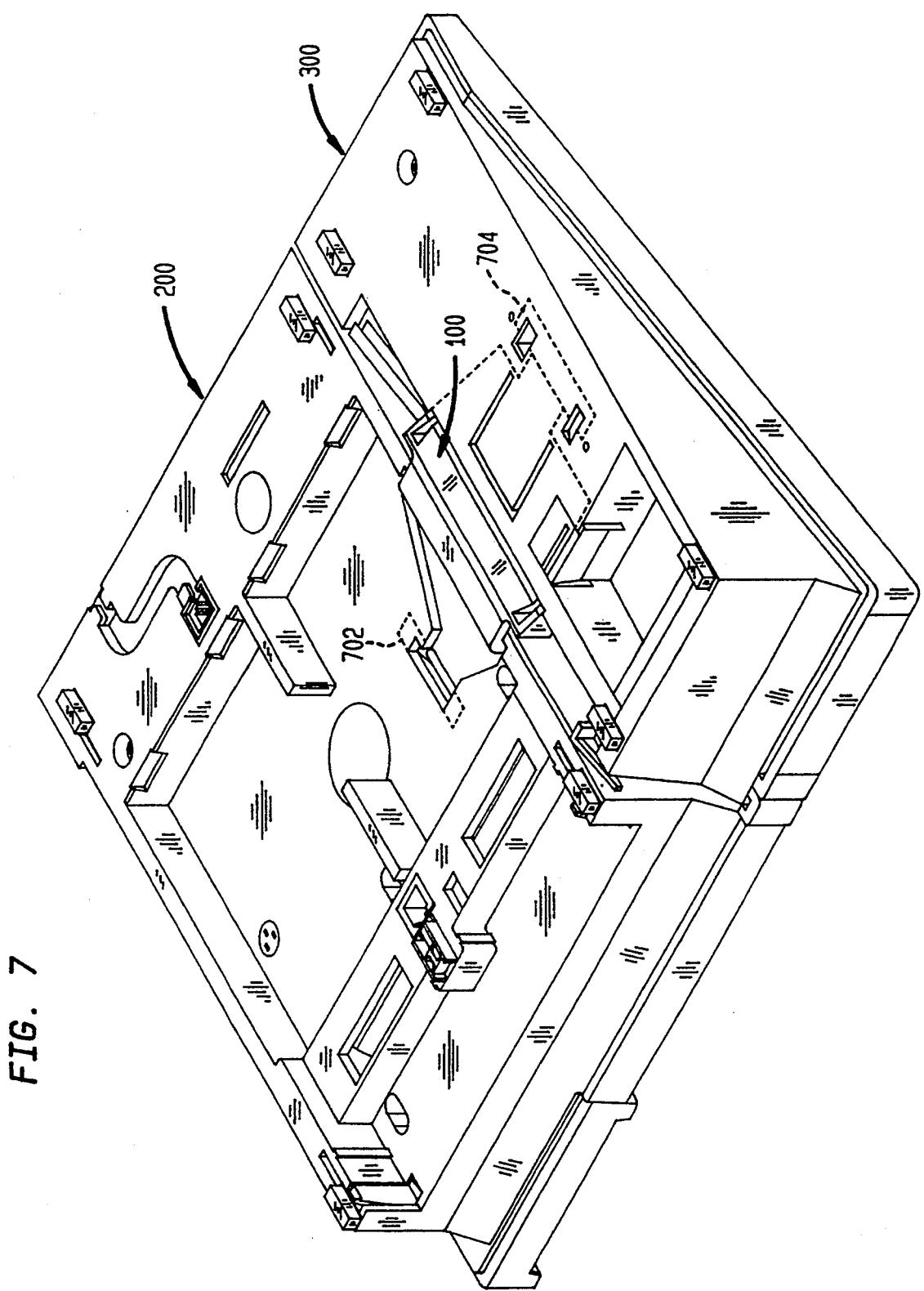
FIG. 7 is a bottom perspective view of the key expansion option module connected to the basic telephone with the key expansion option interconnect bracket.

A connector is recessed within the tab receiving slot 220. Referring to FIG. 7, this internal connector, referred to as internal main unit connector 702, is shown located inside the main unit and coupled to main unit connector 102. In the preferred embodiment of the present invention, the internal main unit connector 702 is configured to create an electrical connection with the traces on main unit tab 102. However, one should know that any type of connector which is compatible with the main unit tab 102 with raised traces may be used.

The angle at which the tab extension 118 is connected to the elevator member 120 of bracket 100 is determined by the angle which exists between the inner surface 214 and the bottom surface of the option module bay 208. In addition, the thickness of side wall 216 at the recessed area 218 is approximately equal to distance D1 (see FIG. 3) between guides 126, 128 and elevator member 120. The correspondence in dimensions insures that the bracket 100 fits snugly around the side wall 216. This prevents the bracket 100 from twisting or bending, causing damage to the connectors in either the basic telephone 200 or the key expansion option module 300.

The interconnect bracket can be permanently or removably attached to the main unit. In the preferred embodiment of the present invention, the key expansion option module interconnect bracket 100 is secured to the basic telephone 200 by screws. These screws go through the fastening holes 130 and 132 and are received by holes in recess 210 which are threaded during screw installation. However, one should know that other permanent or removable fastening devices could also be utilized.

Figure 6:
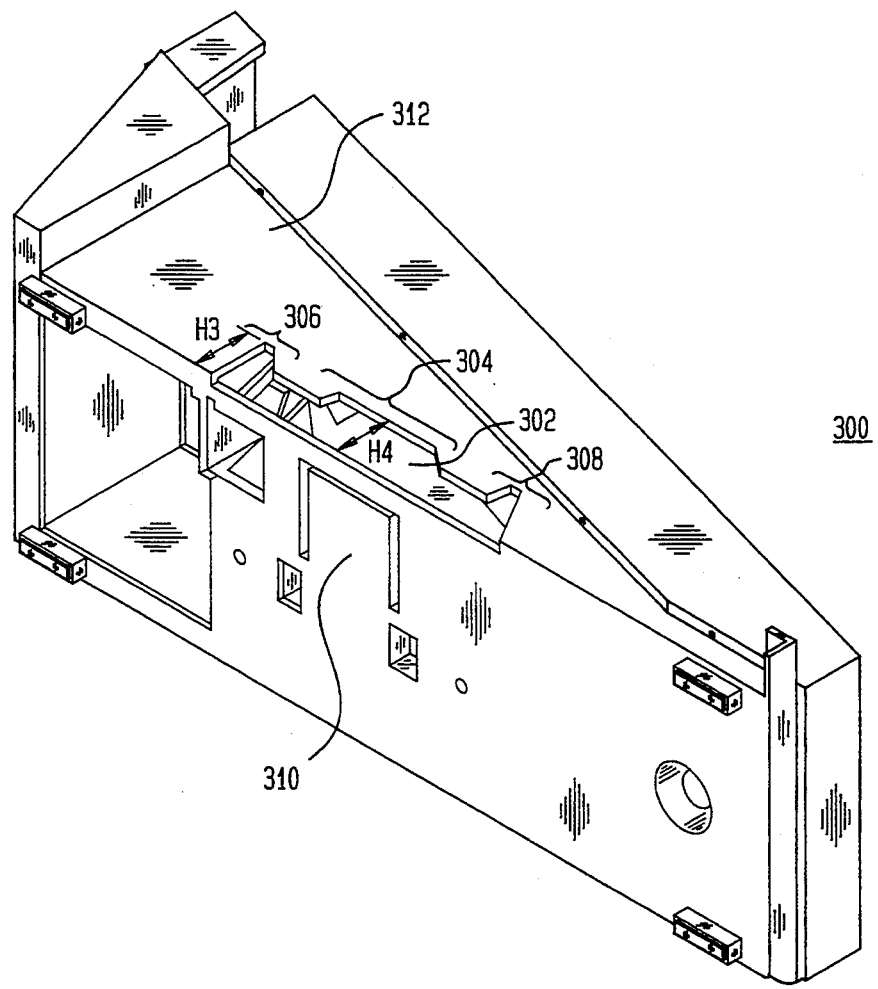
FIG. 6 is a perspective view of the key expansion option module.

Referring to FIG. 6, the auxiliary unit, in the preferred embodiment, a key expansion option module 300 is illustrated. Key expansion option module 300 has an aperture 302 on a side 312. When the key expansion option module 300 is connected to the basic telephone 200, the side 312 of key expansion option module 300 is nearly flush with and immediately adjacent to outer surface 212 of basic telephone side wall 216 as shown in FIG. 7.

Aperture 302 is configured to receive coupling member 122 of bracket 100. Aperture 302 has two guide receiving portions 306 and 308 which are configured to receive the guides 128 and 126, respectively. Aperture 302 also has a tab receiving portion 304 for receiving module tab 104. The height, shown as dimension H3, of the guide receiving portions 306 and 308 should be approximately equal to the height, shown as dimension H2, that guides 126 and 128 rise above the surface of the coupling member 122. It is also necessary that the height, shown as dimension H4 of the tab receiving portion 304 be approximately equal to the height, shown as dimension H1, that module tab 104 is above the surface of coupling member 122.

An internal connector is recessed within the aperture 302. In the preferred embodiment of the present invention, internal auxiliary device connector 702 is configured to receive and make electrical connection with module tab 104. However, one should know that any type of connector which is compatible to the module tab 104 with raised traces may be used.

The height of the guide receiving portions 306 and 308 and the tab receiving portion 304 limit the angle at which the coupling member 122 is inserted into the aperture 302. This insures that once the coupling member 122 is inserted into the aperture 302, it is self-guided. The module tab 104 connects with the connector internal to the key expansion option module 300. In the preferred embodiment of the present invention, the guide members 126 and 128 extend a substantial portion of the length of coupling member 122. However, the length of guides 126 and 128 only need to be as long as is necessary to insure that the module tab 104 aligns with the internal connector (not shown) in the key expansion option module when the coupling member is installed in aperture 302.

The key expansion option module 300 has a snapping connector 310. The upper surface of the snapping connector 310 has a raised portion (not shown) corresponding in shape and size to snap-connector aperture 134. The snap connector 310 is-configured to release when subjected to forces such as would be experienced if the coupled units were dropped. When the basic telephone 200 unit and the key expansion option module 300 come apart, they distribute the force of the drop between them, thus reducing the total shock to their components.

In the preferred embodiment of the present invention the interconnect bracket mechanically and electrically connects a key expansion option module to a basic telephone. However, one should know that this invention may be used in other applications which require both a sturdy mechanical attachment and an electrical connection between a main module and an auxiliary device. For example, the present invention may be used to connect additional disk drives as well as accessories to a computer, audio/visual components connected together, or automatic controllers and timers could be added onto household appliances.

While the invention has been particularly shown and described with reference to a preferred embodiment thereof, it will be understood by those skilled in the art that various changes in form and details may be made therein without departing from the spirit and scope of the invention.

What is claimed is:

1. An interconnect bracket which mechanically and electrically connects an auxiliary device having: (a) an aperture with a guide receiving portion and a tab receiving portion, (b) a first fastening means, and (c) an internal auxiliary device connector accessible through the aperture with a main unit having: (a) a base with a bottom surface, (b) a side wall with an inner surface adjacent to the bottom surface, (c) a recessed area within the bottom surface and the inner surface, (d) a tab receiving slot, and (e) an internal main unit connector located within the tab receiving slot, the interconnect bracket comprising:

a main unit connector configured to be detachably connectable to the internal main unit connector;

a main unit bracket joined to and integral with the main unit connector, the main unit bracket being adapted to fit within the recessed area in the main unit and to position the main unit connector in connection with the internal main connector, the main unit bracket having one or more fastening holes for fastening the main unit bracket to the main unit;

a coupling member joined to and integral with the main unit bracket on a side opposite to said main unit connector;

an auxiliary device connector joined to and integral with the coupling member on a side opposite the main unit bracket and configured to be detachably connectable to the internal auxiliary device connector; wherein the main unit connector, the main unit bracket, the coupling member, and the auxiliary device connector form a single integrated unit; and one or more traces which are disposed on the surface of the interconnect bracket and which extend from the main unit connector to the auxiliary device connector, the traces electrically connecting the main unit connector with the auxiliary device connector and the traces joined to the auxiliary device connector forming a means for electrically connecting the auxiliary device connector with the internal auxiliary device connector and the traces joined to the main unit connector forming a means for electrically connecting the main unit connector with the internal main unit connector;

the coupling member further comprising:

second fastening means for removably mating with the first fastening means in the auxiliary device to secure the interconnect bracket with the auxiliary device;

a guide, joined to and integral with said coupling member and configured to be received by the guide receiving portion of the auxiliary device, for cooperating with the guide receiving portion of the auxiliary device to restrict travel of the interconnect bracket into the auxiliary device for aligning the auxiliary device connector with the internal auxiliary device connector; and a riser, connected to the coupling member on a side opposite the main unit bracket and connected to the auxiliary device connector, the riser being configured to align the auxiliary device connector with the internal auxiliary connector.

2. The interconnect bracket of claim 1 wherein said auxiliary device connector is a tab.

3. The interconnect bracket of claim 2 wherein said main unit connector is a tab.

4. The interconnect bracket of claim 3 wherein the main unit is a basic telephone and said auxiliary unit comprises a key expansion option module.

* * * * *